US010982695B2

United States Patent
Kim et al.

(10) Patent No.: US 10,982,695 B2
(45) Date of Patent: Apr. 20, 2021

(54) PRESSURE-COMPENSATED LOAD TRANSFER DEVICE

(71) Applicants: Kyoung-hong Kim, Daejeon (KR); Jin-seon Kim, Daejeon (KR); Jong-sung Yoo, Daejeon (KR); Kyeong-lak Jeon, Daejeon (KR); Kyong-bo Eom, Daejeon (KR); Joon-kyoo Park, Daejeon (KR); Young-ik Yoo, Daejeon (KR); Oh-joon Kwon, Daejeon (KR); Joong-jin Kim, Sejong (KR); Tae-kwon Lee, Daejeon (KR)

(72) Inventors: Kyoung-hong Kim, Daejeon (KR); Jin-seon Kim, Daejeon (KR); Jong-sung Yoo, Daejeon (KR); Kyeong-lak Jeon, Daejeon (KR); Kyong-bo Eom, Daejeon (KR); Joon-kyoo Park, Daejeon (KR); Young-ik Yoo, Daejeon (KR); Oh-joon Kwon, Daejeon (KR); Joong-jin Kim, Sejong (KR); Tae-kwon Lee, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 0 days.

(21) Appl. No.: 16/245,940

(22) Filed: Jan. 11, 2019

(65) Prior Publication Data

US 2019/0145436 A1 May 16, 2019

Related U.S. Application Data (63) Continuation of application No. PCT/KR2016/007906, filed on Jul. 20, 2016.

(30) Foreign Application Priority Data

Jul. 13, 2016 (KR) .................. 10-2016-0088443

(51) Int. Cl.
*F04B 45/02* (2006.01)
*F15B 15/14* (2006.01)
(Continued)

(52) U.S. Cl.
CPC .......... *F15B 15/1404* (2013.01); *F15B 13/02* (2013.01); *F15B 15/1476* (2013.01); *F15B 15/17* (2013.01); *F16H 35/00* (2013.01)

(58) Field of Classification Search
CPC ........ F04B 9/131; F04B 43/073; F04B 43/10; F04B 35/00; F04B 45/02; F04B 45/04
(Continued)

(56) References Cited

U.S. PATENT DOCUMENTS 7,458,309 B2 * 12/2008 Simmons .............. F04B 43/067
417/393
9,239,047 B2 * 1/2016 Iwabuchi ................ F04B 43/10
(Continued)

FOREIGN PATENT DOCUMENTS

| JP | S58109774 A | 6/1983 |
| JP | 2004214527 A | 7/2004 |

(Continued)

*Primary Examiner* — Christopher P Schwartz
(74) *Attorney, Agent, or Firm* — Reinhart Boemer Van Deuren P.C.

(57) ABSTRACT

Provided are embodiments of a pressure-compensated load transfer device that includes a plate having a first shaft vertically installed on one side and a second shaft vertically installed on the other side to be coaxial with the first shaft. Also included is a first bellows having an opening in one side to surround the first shaft, with the other side thereof being fixed to the one side of the plate. Further included is a plurality of second bellows each having an opening in one end, with the other end thereof being attached to the other side of the plate. A housing is also included, and the housing includes a high-pressure working hole communicating with the opening of the first bellows and a high-pressure channel (Continued)

coplanar with the high-pressure working hole and communicating with the openings of the second bellows. The plate is back-and-forth movably received in the housing.

5 Claims, 8 Drawing Sheets

(51) Int. Cl.
*F16H 35/00* (2006.01)
*F15B 13/02* (2006.01)
*F15B 15/17* (2006.01)

(58) Field of Classification Search
USPC .............................. 417/392–395, 472, 473
See application file for complete search history.

(56) References Cited

U.S. PATENT DOCUMENTS

| | | | |
|---|---|---|---|
| 10,550,835 B2* | 2/2020 | Oniduka | F04B 43/107 |
| 2006/0165541 A1* | 7/2006 | Teshima | F04B 11/0016 |
| | | | 417/472 |
| 2010/0119392 A1* | 5/2010 | Masuda | F04B 43/084 |
| | | | 417/472 |
| 2010/0178182 A1* | 7/2010 | Simmons | F04B 9/135 |
| | | | 417/472 |

FOREIGN PATENT DOCUMENTS

| | | |
|---|---|---|
| KR | 10-1997-0704116 A | 8/1997 |
| KR | 10-2005-0046037 A | 5/2005 |
| KR | 10-2006-0084890 A | 7/2006 |
| KR | 10-1244307 B1 | 3/2013 |

* cited by examiner

PRESSURE-COMPENSATED LOAD TRANSFER DEVICE

CROSS-REFERENCE TO RELATED PATENT APPLICATIONS

This patent application is a continuation of PCT/KR2016/007906, filed Jul. 20, 2016, which claims priority to Korean Patent Application No. 10-2016-0088443, filed Jul. 13, 2016, the entire teachings and disclosure of which are incorporated herein by reference thereto.

TECHNICAL FIELD

The present invention relates to a pressure-compensated load transfer device and, more particularly, to a pressure-compensated load transfer device using a flexible beam designed to have a high load transfer ratio.

BACKGROUND ART

To transfer motion between spaces having different levels of pressure, motion from a low-pressure side to a high-pressure side may be provided by applying a force equal to or greater than a force able to overcome the difference between the different levels of pressure. However, when the pressure of the high-pressure side is excessively higher than the pressure of the low-pressure side, the capacity of a shaker or an actuator generating motion may be exceeded and no motion may be provided.

Accordingly, a pressure-compensated load transfer device using a flexible beam designed to have a high load transfer ratio is demanded.

RELATED ART DOCUMENT

Patent Document

Patent Document 1: Korean Patent No. 10-0648953 (Nov. 16, 2006)

BRIEF SUMMARY

Accordingly, the present invention has been made keeping in mind the above problems occurring in the prior art, and an object of the present invention is to provide a pressure-compensated load transfer device able to uniformly provide load to a high-pressure side and a low-pressure side and lower stiffness in a moving direction, thereby minimizing loss in a load transferred.

The object of the present invention is not limited to the aforementioned description, and other objects not explicitly disclosed herein will be clearly understood by those skilled in the art to which the present invention pertains from the description provided hereinafter.

In order to accomplish the above object and to perform characteristic functions of the present invention, which will be described later, the present invention has the following characteristic features.

The pressure-compensated load transfer device according to the present invention includes: a flat plate, with a first shaft being perpendicularly disposed on one surface thereof, and a second shaft being located to be coaxial therewith and perpendicularly disposed on the other surface thereof; a first bellows having an opening provided in one side to surround the first shaft, with the other side being fixed to the surface of the plate on which the first shaft is disposed; a plurality of second bellows respectively having an opening in one end, with the other end being attached to the surface of the plate on which the second shaft is disposed; and a housing provided with a high-pressure acting hole communicating with the one-side opening of the first bellows and high-pressure flow paths provided coplanar with the high-pressure acting hole to communicate with the openings of the second bellows, the plate being accommodated in the housing so as to be movable forwards and backwards.

In addition, the pressure-compensated load transfer device according to the present invention further includes: at least one pair of springs disposed on the housing to be symmetrical about the housing; at least one pair of flexible beams respectively having one end connected to a corresponding one among the at least one pair of springs and the other end connected to the plate; and at least one pair of compressive-adjusting means connected to the at least one pair of springs.

According to the present invention, force balance is provided using static load acting on the bellows, and load can be more efficiently transferred using negative stiffness of the flexible beams.

DETAILED DESCRIPTION

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

Throughout the specification, the same reference numerals will refer to the same or like parts. The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms, such as "comprise", "include", and "have", and variations thereof, when used in this specification, specify the presence of stated features, steps, operations, and/or elements, but do not preclude the presence or addition of one or more other features, steps, operations, and/or elements.

Hereinafter, the present invention will be described in detail with reference to the accompanying drawings.

Figure 1:
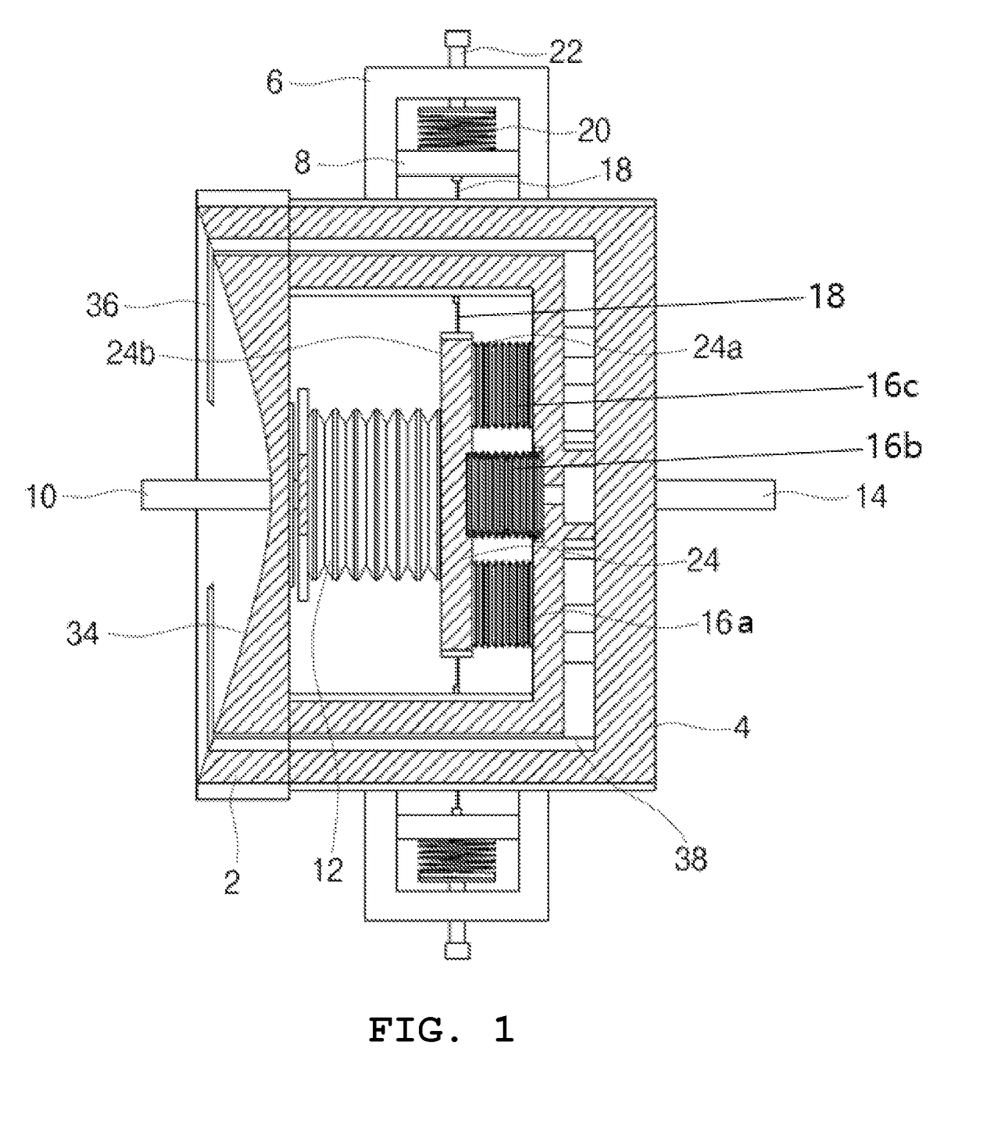
FIG. 1 illustrates a cross-sectional view taken along line A-A of FIG. 3B depicting an internal configuration of a pressure-compensated load transfer device according to the present invention, inside of a side surface thereof.

As illustrated in FIG. 1, a pressure-compensated load transfer device 1 according to the present invention includes a flat plate 24, a first bellows 12, a plurality of second bellows 16 (individually, second bellows 16a. 16b. 16c. 16d) and a housing. A first shaft 10 is perpendicularly disposed on one surface of the flat plate 24, and a second shaft 14 is located to be coaxial with the flat plate 24 and perpendicularly disposed on the other surface of the flat plate 24. The first bellows 12 has an opening provided in one side to surround the first shaft 10, with the other side being fixed to the surface of the plate 24 on which the first shaft 10 is disposed. Each of the plurality of second bellows 16 has an opening in one end, with the other end being attached to the surface of the plate 24 on which the second shaft 14 is disposed. The housing is provided with a high-pressure acting hole 32 communicating with the one-side opening of the first bellows 12 and high-pressure flow paths 38 provided coplanar with the high-pressure acting hole 32 to communicate with the openings of the second bellows 16. The plate 24 is accommodated in the housing so as to be movable forwards and backwards.

Hereinafter, as illustrated in FIG. 1, in the pressure-compensated load transfer device 1 according to an embodiment of the present invention, the first shaft 10 and the second bellows 12 are disposed on one surface of the planar plate 24, i.e. a first surface 24b of the planar plate 24, whereas the second shaft 14 and the plurality of second bellows are disposed on a second surface 24a of the plate 24, i.e. a surface opposite to the first surface 24b of the plate 24.

The first shaft 10 is disposed on the central portion of the first surface 24b of the plate 24. The first bellows 12 is provided with the opening in the end portion thereof, opposite to the end portion thereof attached to the first surface 24b of the plate 24. The first bellows 12 is disposed to surround a portion of the first shaft 10. In other words, as illustrated in FIG. 2, the first bellows 12 is provided on the same axis as the first shaft 10, such that the first bellows 12 and the first shaft 10 are concentric.

Figure 2:
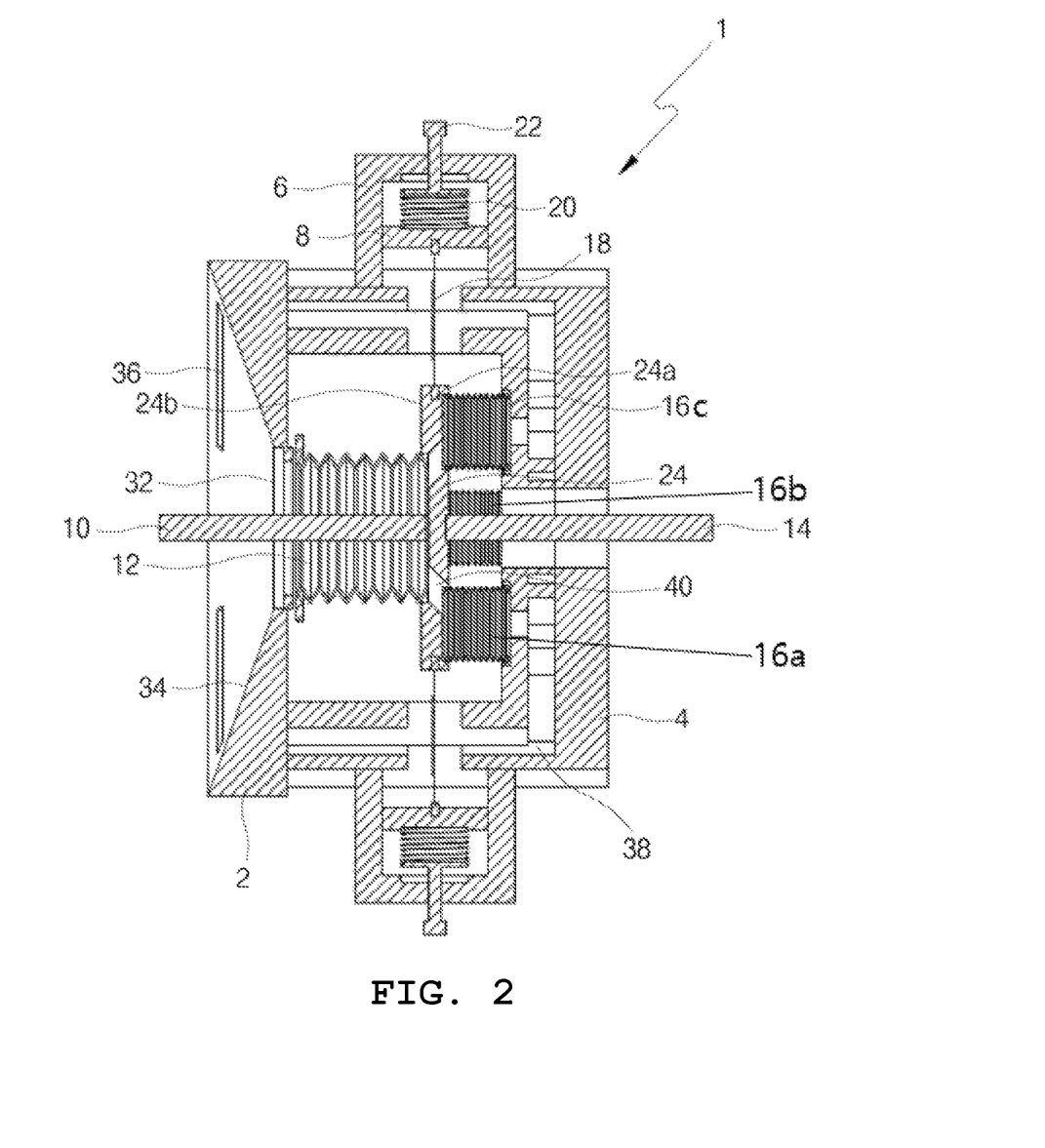
FIG. 2 illustrates a cross-sectional view of the side surface of the pressure-compensated load transfer device according to the present invention taken along line B-B of FIG. 3B.
Figure 3A:
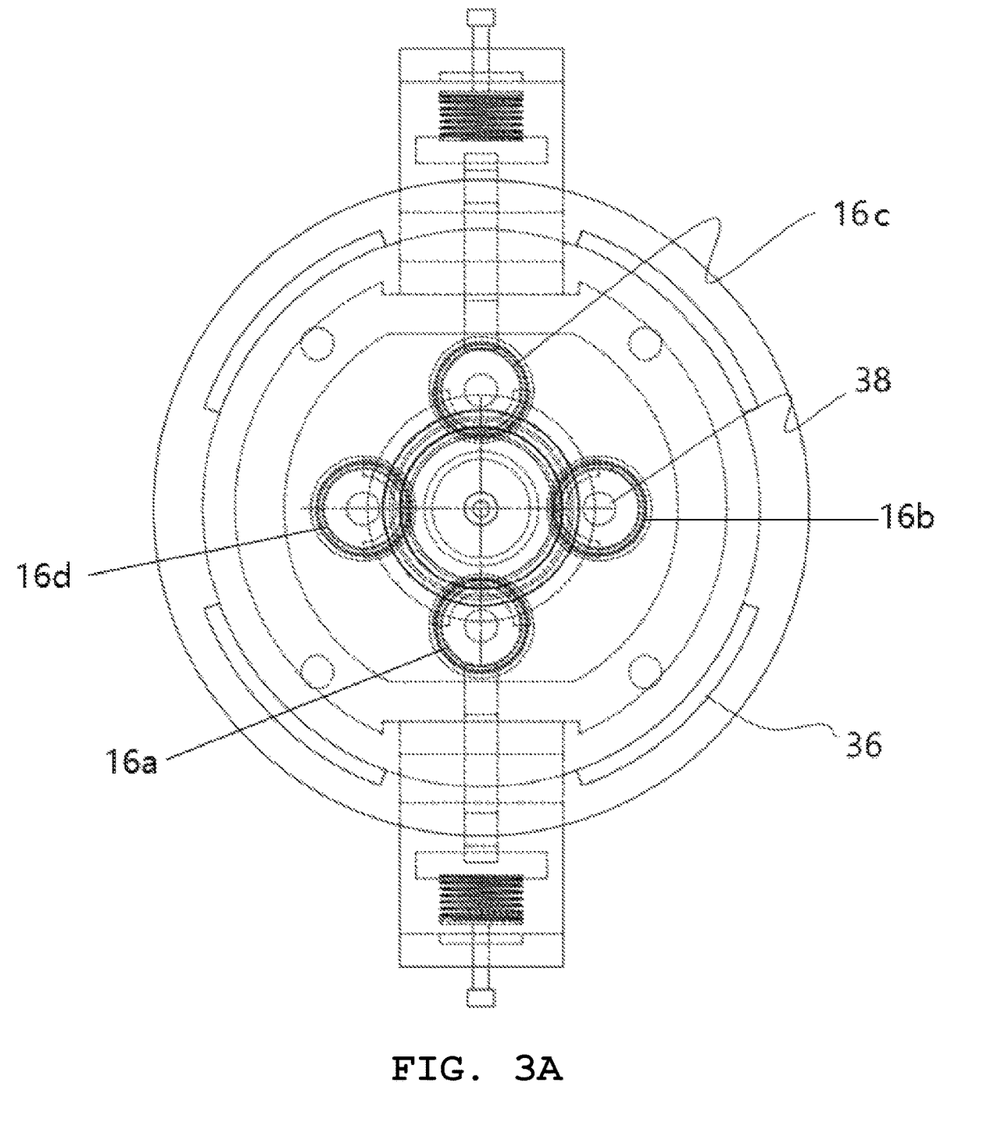
FIG. 3a is a front opened-up view of the pressure-compensated load transfer device according to the present invention.

As illustrated in FIG. 2, the second shaft 14 is disposed on the central portion of the second surface 24a of the plate 24 to be axially aligned with the first shaft 10 disposed on the first surface 24b. That is, the first shaft 10 and the second shaft 14 are disposed on the same axis. As illustrated in FIG. 3a, the plurality of second bellows 16 is attached to surroundings of the second shaft 14 while being concentric about the central portion of the plate 24. The plurality of second bellows 16 may be provided as two or more bellows. Two or more second bellows may properly be disposed depending on the size of the pressure-compensated load transfer device 1. Although four second bellows 16a, 16b, 16e, 16 are disposed in FIG. 3a, it will be apparent to those skilled in the art that this is merely an embodiment and the second bellows are not limited to the four bellows.

Like the opening being provided in one end portion of the first bellows 12, openings are provided in end portions of the plurality of second bellows 16, opposite to the end portions of the plurality of second bellows 16 attached to the second surface 24a of the plate 24.

Figure 4:
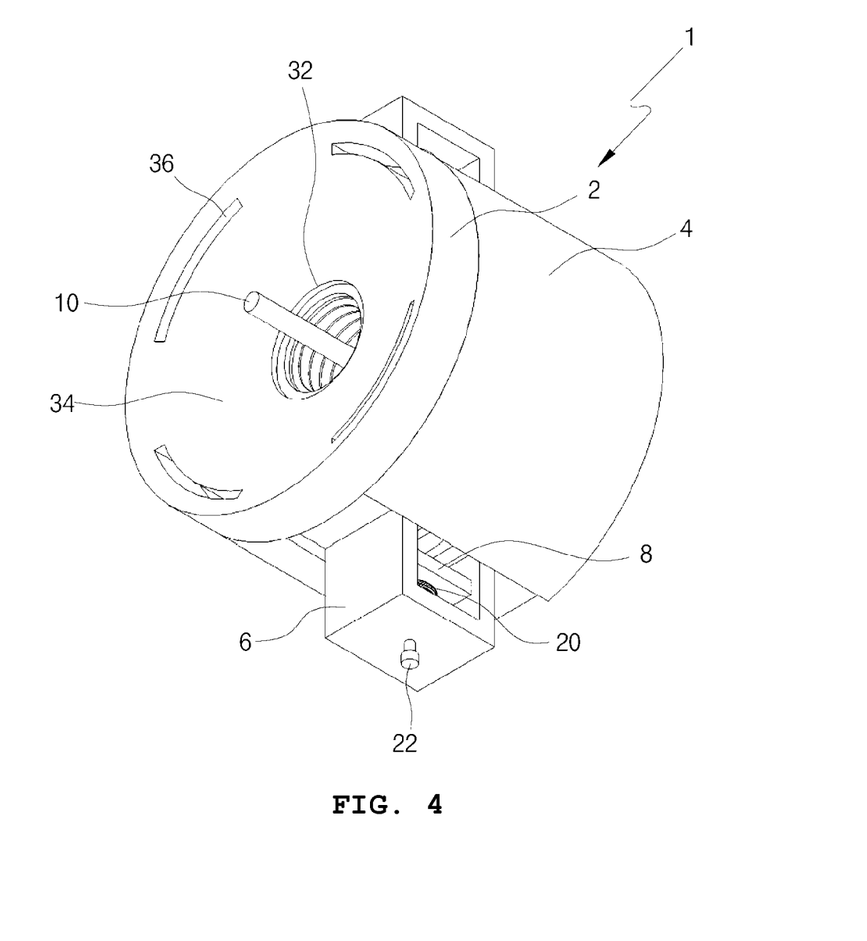
FIG. 4 illustrates an external appearance of the side surface of the pressure-compensated load transfer device according to the present invention.

As illustrated in FIG. 4, the pressure-compensated load transfer device 1 according to an embodiment of the present invention may further include a first housing 2 and a second housing 4 surrounding the bellows 12 and 16, the plate 24, and the shafts 10 and 14. Although the housings are described herein as being two entities for the sake of brevity, it should be understood that the housings may be provided as a single entity.

Figure 3B:
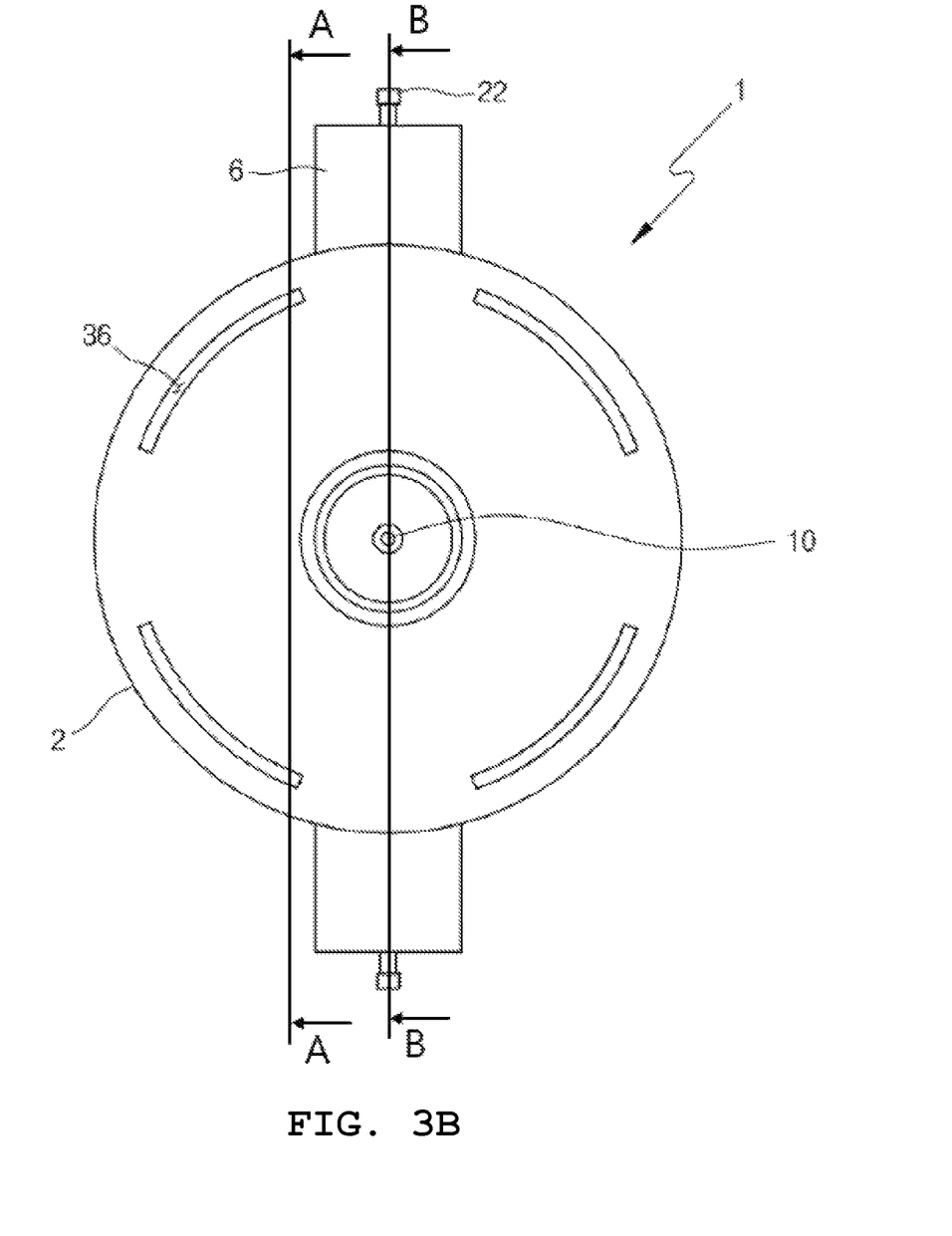
FIG. 3b is a front elevation view of the pressure-compensated load transfer device according to the present invention.

As illustrated in FIG. 4, the high-pressure acting hole 32 is provided in the central portion of the first housing 2 to communicate with the opening of the first bellows 12. Referring to FIGS. 3b and 4, inlets 36 are provided around the high-pressure acting hole 32. Particularly, the inlets 36 may be elongated predetermined lengths in the circumferential direction while being spaced apart predetermined distances from the periphery of the surface of the first housing 2. The inlets 36 may be provided as a plurality of inlets. Particularly, the inlets 36 may be provided as two or more inlets arranged symmetrically about the center of the surface of the first housing 2. Although a configuration provided with four high-pressure inlet pipes is illustrated in the drawings, it should be understood that this configuration is merely an embodiment and it is not intended to limit the number of the high-pressure inlet pipes to 4.

Figure 5:
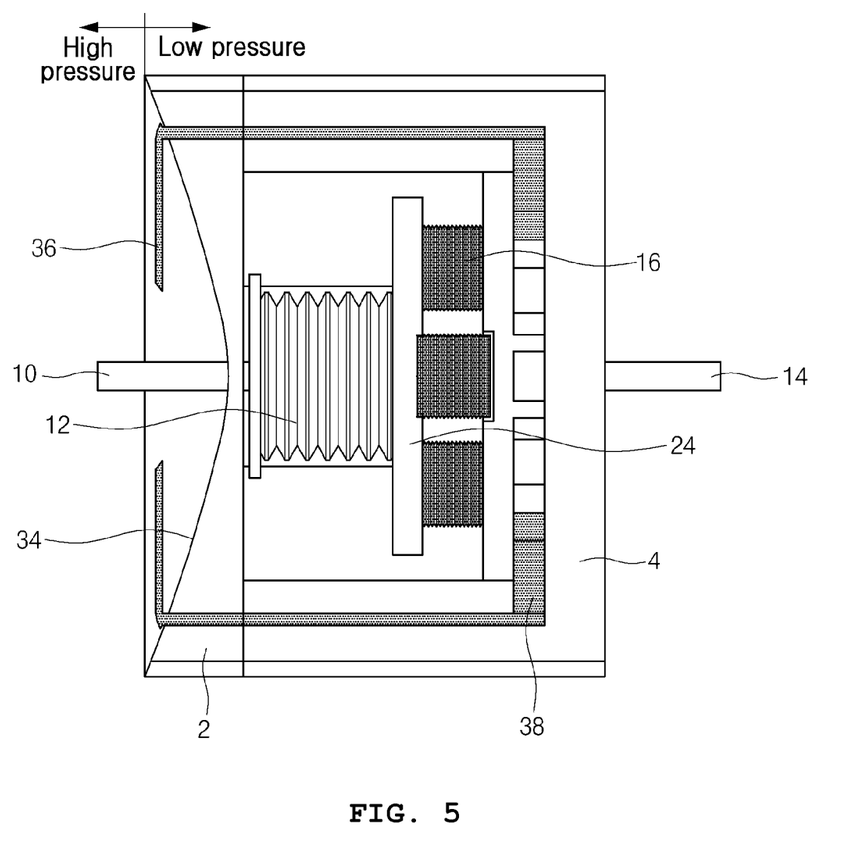
FIG. 5 illustrates a path along which fluid is delivered to a second bellows through a high-pressure flow path in a pressure-compensated load transfer device according to an embodiment of the present invention.

As illustrated in FIG. 5, the inlets 36 communicate with the high-pressure flow paths 38 extending to rear portions of the second housing. In addition, the high-pressure flow paths 38 communicate with the open ends of the plurality of second bellows 16. Although the inlets 36 and the high-pressure flow paths 38 have been described using different reference numerals for the sake of brevity, it should be understood that the inlets 36 and the high-pressure flow paths 38 can be provided as the same components.

As illustrated in FIG. 2, the pressure-compensated load transfer device 1 according to an embodiment of the present invention may further include at least one pair of flexible beams 18. Particularly, the pair of flexible beams 18 is arranged symmetrically about the center of the surface of the plate 24, with one end portion of each of the flexible beams 18 being connected to the plate 24.

As illustrated in FIG. 2, the pressure-compensated load transfer device may further include at least one pair of springs 20 respectively having one end portion connected to a corresponding one of the pair of flexible beams 18. In addition, the at least one pair of springs 20 may be connected to at least one pair of spring compressive force adjusting means, which the compressive force of the springs 20 to be adjustable.

Although a pair of flexible beams, a pair of springs, and a pair of spring compressive force adjusting means are illustrated in the drawings, it should be understood that this is merely an embodiment and more pairs of flexible beams, springs, and spring compressive force adjusting means may be included. Types of implementable springs include all types of elastic members, such as a coil spring, which those skilled in the art can use. The spring compressive force adjusting means include any adjusting means that those skilled in the art can use to adjust the compressive force of springs. In the specification and drawings, a means for adjusting compressive force by a simple manipulation is described. The means for adjusting compressive force include spring compressive force adjusting screws 22 respectively provided on one end of a corresponding spring. The spring compressive force adjusting screws 22 adjust a load applied to the flexible beams 18 by adjusting displacements of the springs 20.

A mode in which the flexible beams 18, the springs 20, and the spring compressive force adjusting screws 22 are disposed in positions in the pressure-compensated load transfer device 1 according to the present invention is illustrated in FIG. 2. As illustrated in FIG. 2, fixing portions 6 and connecting portions 8 may be provided on outer portions of the housing to fix the flexible beams 18, the springs 20, and the spring compressive force adjusting screws 22.

Figure 7:
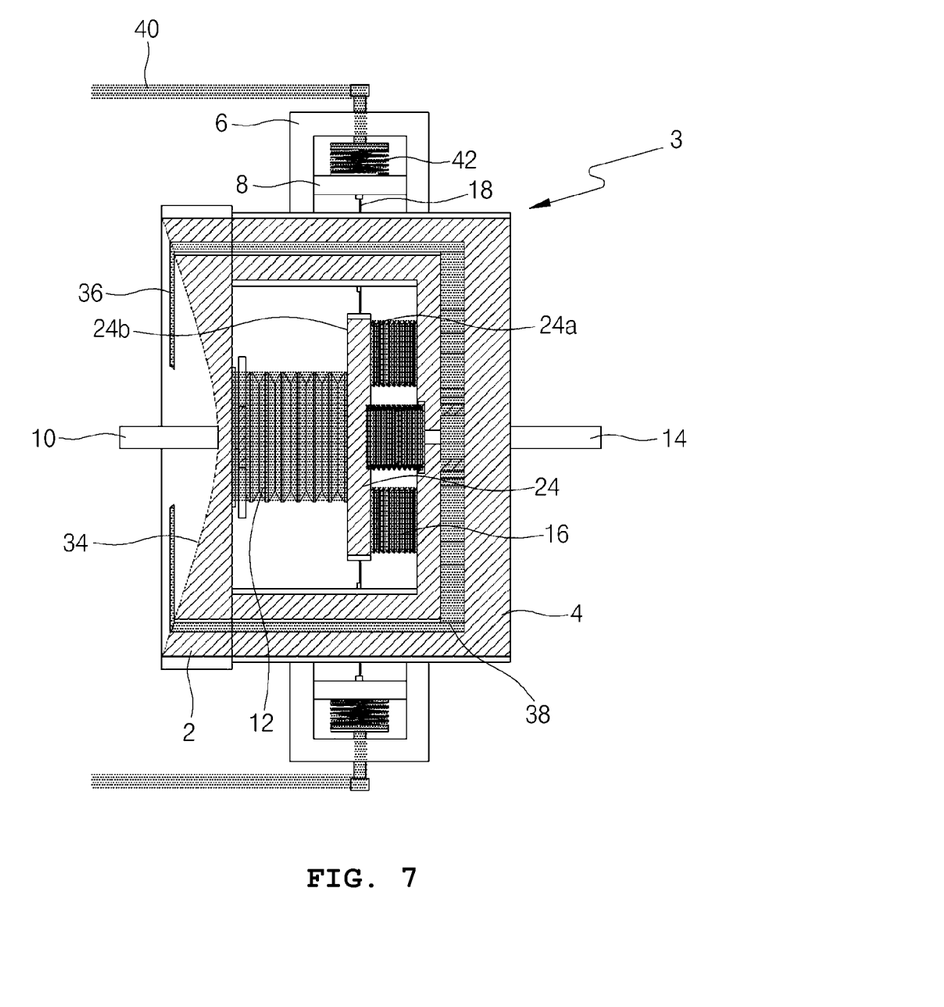
FIG. 7 illustrates a pressure-compensated load transfer device according to another embodiment of the present invention.

In addition, according to another mode of the present invention, third bellows 42 may be employed in place of the springs 20. As illustrated in FIG. 7, a pressure-compensated load transfer device 3 according to another embodiment of the present invention may further include at least one pair of third bellows 42, one end portion of each being connected to a corresponding flexible beam of the at least one pair of flexible beams 18. In addition, the other end portions of the at least one pair of third bellows 42 may be connected to at least one pair of high-pressure paths 40, respectively. The high-pressure paths 40 may be paths along which high-pressure fluid provided by a high-pressure side flows. Compressive force applied to the flexible beams 18 by the third bellows 42 may be actively adjusted by the pressure of fluid delivered along the high-pressure paths 40 by the high-pressure side.

In addition, as illustrated in FIG. 1, the pressure-compensated load transfer device 1 according to one mode of the present invention may have a slope tap 34 on one surface of the first housing 2. For example, the slope tap 34 is provided as an inclined surface extending radially from the periphery to a central portion of one surface of the first housing 2. The slope tap 34 is provided to rapidly remove residual gas when fluid is introduced toward the first bellows 12.

The bellows 12 and 16 are typically made of metal. The plate 24 is provided as a flat plate having a predetermined thickness. The plate 24 is illustrated as being circular for the sake of brevity of the drawings, although the shape thereof is not particularly limited.

According to an embodiment of the present invention, as illustrated in FIG. 2, a bore 40 may be provided in the plate 24. Since the first bellows 12 and the plurality of second bellows 16 are not provided on the same axis, as illustrated in FIG. 3a, the bore 40 may be provided in oblique directions in a thickness portion of the plate 24. The bore 40 causes the first bellows 12 to communicate with at least one second bellows 16 among the plurality of second bellows 16, such that fluid can be supplied more efficiently from the first bellows 12 to the second bellows 16.

The action and principle of the pressure-compensated load transfer device according to the present invention are as follows.

The second shaft 14 is connected to a motion-generating external device, such as an actuator or a shaker, such that motion transferred to the second shaft 14 is transferred to the plate 24. The motion transferred to the plate 24 is transferred to the first shaft 10, by which the motion is transferred to other systems around the first shaft 10.

As illustrated in FIG. 5, a left portion of the first housing 2 corresponds to a high-pressure area, while a right portion of the first housing 2 corresponds to a low-pressure area. The first bellows 12 serves to convert high pressure, applied through the high-pressure acting hole 32 from the high-pressure area, into load and transfer the load to the plate 24, as well as to prevent fluid from leaking to the low-pressure area while the motion is being generated. Fluid having high pressure is delivered to the plurality of second bellows 16 through the high-pressure flow paths 38 from the high-pressure area, and load is transferred to the plate 24 via the plurality of second bellows 16. In addition, the second bellows 16 serve to prevent fluid from leaking to the low-pressure area while the motion is being generated. The plate 24 is connected to the first and second shafts, the bellows, and the flexible beams, thereby helping motion to be efficiently transferred from the low-pressure area to the high-pressure area.

Figure 6:
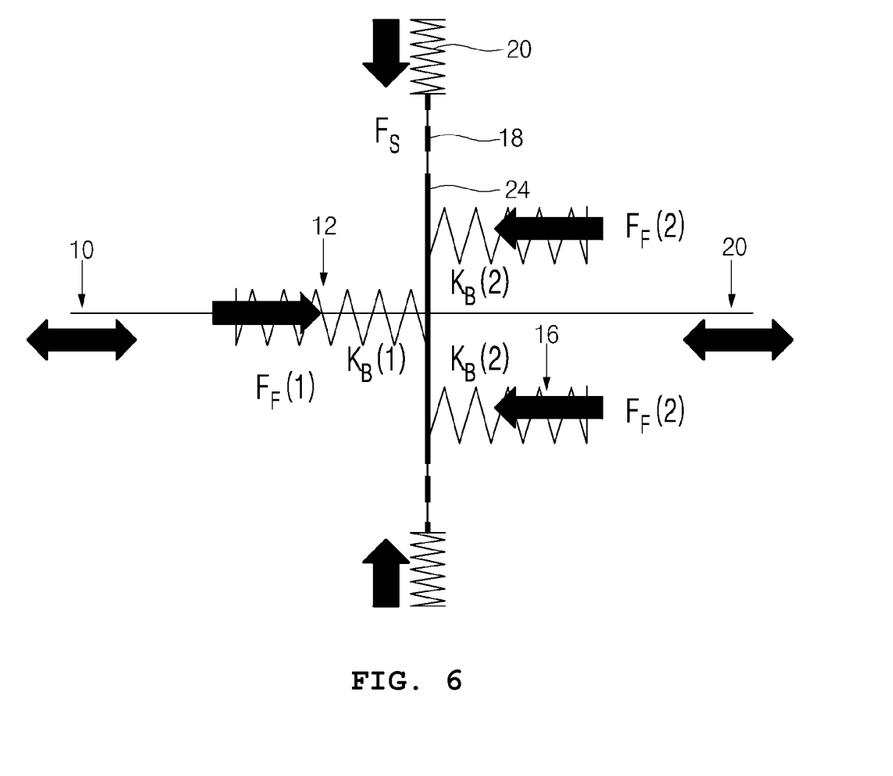
FIG. 6 illustrates a conceptual view of the pressure-compensated load transfer device according to the present invention.

As illustrated in FIG. 6, high pressure causes the first bellows 12 to provide force $F_F(1)$ to the plate 24. Due to force $F_F(2)$ provided to the plurality of second bellows 16, high pressure transferred through the high-pressure flow paths 38 provides opposite directional force to the plate 24. Here, the area of the first bellows 12 is designed to be the same as the total area of the plurality of second bellows 16, and the force $F_F(1)$ generated based on the area of the first bellows 12 is equal to the force $F_F(2)$.

In addition, stiffness influencing the direction of the motion is expressed using attenuation of the high-pressure fluid and a sum of stiffness values of the bellows, as in Formula 1.

Formula 1

$$mx''+cx'+[k_B(1)+k_B(2)]x=F \quad \text{[Formula 1]}$$

In Formula 1, m indicates a mass of moving fluid, among fluid in the bellows, and the system, c indicates fluid and system attenuation in the bellows, $k_B(1)$ indicates stiffness of the first bellows, $k_B(2)$ indicates stiffness of the second bellows, F indicates load provided in a moving direction, x indicates a displacement of the plate 24, x' indicates a velocity of the plate 24, and x'' indicates an acceleration of the plate 24.

Here, when the spring and the flexible beams are provided, the springs 20 provide compressive force to the flexible beams 18, while the flexible beams 18 are connected to the plate 24 to provide negative stiffness in a moving direction, in response to the compressive force being applied thereto by the springs 20. When the compressive force is provided to the helical springs 20 connected to the flexible beams 18, stiffness in a moving direction is the same as expressed in Formula 2 and is lower than that expressed in Formula 1. As a result, a moving minimum load is also reduced.

Formula 2

$$mx\ddot{} + c\dot{x} + [k_B(1) + k_B(2) - k_f]x = F \quad \text{[Formula 2]}$$

Here, $k_f$ indicates stiffness generated in the moving direction by the compressive force applied to the flexible beam.

Accordingly, the pressure-compensated load transfer device according to the present invention is devised to obtain force balance using static load acting on the bellows and more efficiently transfer load using negative stiffness of the flexible beams.

In addition, according to the present invention, compressive force is provided to the flexible beams in a passive manner by adjusting the spring compressive force adjusting screws 22. Alternatively, an active mode may also be provided by using additional or the third bellows 42 in place of the helical springs 20 to be connected to the high-pressure side so that compressive force of the flexible beams is adjusted according to pressure transferred from the high-pressure side. That is, the bellows may be used as means for actively providing compressive force to the flexible beans, according to the pressure of the high-pressure side.

The present invention as set forth above is not limited to the foregoing exemplary embodiments or the accompanying drawings, and those skilled in the art will appreciate that various substitutions, modifications, and alterations are possible, without departing from the scope and spirit of the present invention as disclosed in the accompanying claims.

[Description of the Reference Numerals in the Drawings]

| | |
|---|---|
| 1, 3: Pressure-compensated load transfer device | |
| 2: First housing | |
| 4: Second housing | 6: Fixing portion |
| 8: Connecting portion | 10: First shaft |
| 12: First bellows | 14: Second shaft |
| 16: Second bellows | 18: Flexible beam |
| 20: Spring | |
| 22: Spring compressive force adjusting screw | |
| 24: Plate | 24a: Second surface |
| 24b: First surface | |
| 32: High-pressure acting hole | |
| 34: Slope tap | 36: Inlet |
| 38: High-pressure flow path | |
| 40: High-pressure path | |
| 42: Third bellows | |

The invention claimed is:

1. A pressure-compensated load transfer device comprising:
   a flat plate, with a first shaft being perpendicularly disposed on one surface thereof, and a second shaft being located to be coaxial therewith and perpendicularly disposed on the other surface thereof;
   a first bellows having an opening provided in one side to surround the first shaft, with the other side being fixed to the surface of the plate on which the first shaft is disposed;
   a plurality of second bellows respectively having an opening in one end, with the other end being attached to the surface of the plate on which the second shaft is disposed; and
   a housing provided with a high-pressure acting hole communicating with the one-side opening of the first bellows and high-pressure flow paths provided coplanar with the high-pressure acting hole to communicate with the openings of the second bellows, the plate being accommodated in the housing so as to be movable forwards and backwards.

2. The pressure-compensated load transfer device according to claim 1, further comprising:
   at least one pair of springs disposed on the housing to be symmetrical about the housing;
   at least one pair of flexible beams respectively having one end connected to a corresponding one among the at least one pair of springs and the other end connected to the plate; and
   at least one pair of compressive-adjusting means connected to the at least one pair of springs.

3. The pressure-compensated load transfer device according to claim 1, further comprising a slope tap provided on one surface of the first housing in which the high-pressure acting hole and the high-pressure flow paths are provided, the slope tap having an inclined surface extending radially from a periphery to a central portion of the one surface of the first housing.

4. The pressure-compensated load transfer device according to claim 1, wherein the plate is provided with a bore allowing the first bellows to fluid-communicate with at least one second bellows among the plurality of second bellows.

5. The pressure-compensated load transfer device according to claim 1, further comprising:
   at least one pair of third bellows disposed on the housing to be symmetrical about the housing;
   at least one pair of flexible beams respectively having one end connected to a corresponding one among the at least one pair of third bellows and the other end connected to the plate; and
   at least one pair of high-pressure paths connected to the at least one pair of springs, respectively.

* * * * *